(12) United States Patent
Fujiwara et al.

(10) Patent No.: US 10,948,419 B2
(45) Date of Patent: Mar. 16, 2021

(54) CONCENTRATION MEASUREMENT METHOD

(71) Applicant: HAMAMATSU PHOTONICS K.K., Hamamatsu (JP)

(72) Inventors: Kazuhiko Fujiwara, Hamamatsu (JP); Yoshihiro Maruyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 207 days.

(21) Appl. No.: 15/776,517

(22) PCT Filed: Nov. 15, 2016

(86) PCT No.: PCT/JP2016/083852
§ 371 (c)(1),
(2) Date: May 16, 2018

(87) PCT Pub. No.: WO2017/086318
PCT Pub. Date: May 26, 2017

(65) Prior Publication Data
US 2018/0328852 A1    Nov. 15, 2018

(30) Foreign Application Priority Data
Nov. 18, 2015   (JP) .............................. JP2015-225545

(51) Int. Cl.
*G01N 21/78* (2006.01)
*G01N 21/82* (2006.01)
*G01N 31/22* (2006.01)

(52) U.S. Cl.
CPC ............. *G01N 21/78* (2013.01); *G01N 21/82* (2013.01); *G01N 31/22* (2013.01)

(58) Field of Classification Search
CPC ........ G01N 21/78; G01N 21/82; G01N 31/22; G01N 21/77
See application file for complete search history.

(56) References Cited

U.S. PATENT DOCUMENTS

| 6,716,629 B2* | 4/2004 | Hess ................... B01J 19/0046 |
| | | 435/420 |
| 8,101,424 B2* | 1/2012 | Geddes .................. G01N 21/47 |
| | | 427/10 |
| 2011/0200986 A1* | 8/2011 | Yang .................... G01N 33/542 |
| | | 435/5 |

FOREIGN PATENT DOCUMENTS

| JP | 2006-284186 A | 2/2004 |
| JP | 2006-284186 A | 10/2006 |

(Continued)

OTHER PUBLICATIONS

International Preliminary Report on Patentability dated May 31, 2018 for PCT/JP2016/083852.

(Continued)

*Primary Examiner* — Jennifer Wecker
*Assistant Examiner* — Michael Paul Shimek
(74) *Attorney, Agent, or Firm* — Faegre Drinker Biddle & Reath LLP

(57) ABSTRACT

A concentration measurement method is a method for measuring a concentration of an analyte in a measurement solution containing the analyte having reducing action, and includes a mixing step of preparing a mixture solution by mixing a metal ion solution, a complexing agent, and a pH adjusting agent to prepare an intermediate mixture solution, and mixing the intermediate mixture solution and the measurement solution, a metal microstructure generation step of generating a metal microstructure on a support by reducing metal ions in the mixture solution by the reducing action of the analyte in the mixture solution, a measurement step of measuring an optical response of the metal microstructure on the support, and an analysis step of determining a concentration of the analyte in the measurement solution on the basis of a measurement result of the optical response.

9 Claims, 16 Drawing Sheets

(56) References Cited

FOREIGN PATENT DOCUMENTS

| | | |
|---|---|---|
| JP | 2008-185533 A | 8/2008 |
| JP | 2010-197046 A | 9/2010 |
| JP | 2011-514516 A | 5/2011 |
| JP | 2014-190938 A | 10/2014 |
| WO | WO-2009/103843 A2 | 8/2009 |

OTHER PUBLICATIONS

Yunsheng Xia et al., "Colorimetric Visualization of Glucose at the Submicromole Level in Serum by a Homogenous Silver Nanoprism-Glucose Oxidase System," ACS Publications, Analytical Chemistry, 2013, pp. 6241-6247, vol. 85

Yunlei Xianyu wt al., "An ultrasensitive non-enzymatic glucose assay via gold nanorod-assisted generation of silver nanoparlicles," RSC Publishing, Nanoscale, 2013, pp. 6303-6306, vol. 5

Tangsong Li et al., "Sensitive detection of glucose based on gold nanoparticles assisted silver mirror reaction," Analyst, 2011, pp. 2893-2896, vol. 136

Yun Chen et al., "Design of an enzymatic biofuel cell with large power output," Royal Society of Chemistry, Journal of Materials Chemistry A, 2015, pp. 11511-11516, vol. 3.

Tapan K. Sau et al., "Room Temperature, High-Yield Synthesis of Multiple Shapes of Gold Nanoparticles in Aqueous Solution," Journal of American Chemical Society, 2004, pp. 8648-8649, vol. 126.

Takeshi Yonezawa, "Silver Mirror Reaction Observed by Using Reflected Light," Chemical Education, 2015, pp. 98-100, vol. 63, No. 2, including partial English translation.

Tsutomu Akazawa et al., "The development of silver coating technology by nanoparticles," Reports of Saitama Industrial Technology Center, 2004, 5 pages, vol. 2, including partial English translation.

Tangsong Li, "Optical Detection of Biomolecules Based on Microfluidics and Nanoparticles", CNKI, May 15, 2012, including Partial English-language translation.

* cited by examiner

Fig.4

| | METAL ION SOLUTION | COMPLEXING AGENT | pH ADJUSTING AGENT | ANALYTE CONTAINED IN MEASUREMENT SOLUTION |
|---|---|---|---|---|
| EXAMPLE 1 | 10mM SILVER NITRATE | 50mM AQUEOUS AMMONIUM SULFATE SOLUTION | 200mM AQUEOUS SODIUM HYDROXIDE SOLUTION | GLUCOSE |
| EXAMPLE 2 | 10mM SILVER NITRATE | 50mM AQUEOUS AMMONIUM SULFATE SOLUTION | 200mM AQUEOUS SODIUM HYDROXIDE SOLUTION | FRUCTOSE |
| EXAMPLE 3 | 10mM SILVER NITRATE | 50mM AQUEOUS AMMONIUM SULFATE SOLUTION | 200mM AQUEOUS SODIUM HYDROXIDE SOLUTION | GALACTOSE |
| EXAMPLE 4 | 10mM SILVER NITRATE | 100mM AQUEOUS AMMONIA SOLUTION | 200mM AQUEOUS SODIUM HYDROXIDE SOLUTION | GLUCOSE |

CONCENTRATION MEASUREMENT METHOD

TECHNICAL FIELD

The present invention relates to a method for measuring a concentration of an analyte contained in a measurement solution.

BACKGROUND ART

Patent Documents 1 to 3 and Non Patent Document 1 describe inventions of a method for measuring a concentration of an analyte (for example, a saccharide) contained in a measurement solution. The inventions described in these documents measure a concentration of an analyte by utilizing an oxidation reaction of the analyte, and an enzyme is used in the oxidation reaction of the analyte. Further, inventions described in Non Patent Documents 2 and 3 measure a concentration of an analyte by adding gold nanorods or gold nanoparticles in a measurement solution.

CITATION LIST

Patent Literature

Patent Document 1: Japanese Patent Application Laid-Open Publication No. 2014-190938
Patent Document 2: Japanese Patent Application Laid-Open Publication No. 2008-185533
Patent Document 3: Japanese Patent Application Laid-Open Publication No. 2010-197046

Non Patent Literature

Non Patent Document 1: Yunsheng Xia et al., "Colorimetric Visualization of Glucose at the Submicromole Level in Serum by a Homogenous Silver Nanoprism—Glucose Oxidase System", Analytical Chemistry, 2013, 85, 6241-6247
Non Patent Document 2: Yunlei Xianyu et al., "An ultrasensitive, non-enzymatic glucose assay via gold nanorod-assisted generation of silver nanoparticles", Nanoscale, 2013, 5, 6303-6306
Non Patent Document 3: Tangsong Li et al., "Sensitive detection of glucose based on gold nanoparticles assisted silver mirror reaction", Analyst, 2011, 136, 2893-2896
Non Patent Document 4: Yun Chen, et al., "Design of an enzymatic biofuel cell with large power output", J. Mater. Chem. A., 2015, 3, 11511-11516
Non Patent Document 5: Tapan K. Sau et al., "Room Temperature, High-Yield Synthesis of Multiple Shapes of Gold Nanoparticles in Aqueous Solution", J. Am. Chem. Soc., 2004, 126, 8648-8649

SUMMARY OF INVENTION

Technical Problem

The inventions described in Patent Documents 1 to 3 and Non Patent Document 1 use the enzyme in the oxidation reaction of the analyte, and therefore, the oxidation reaction involves a high selectivity, however, preservation of the enzyme and the measurement procedure are complicated. The inventions described in Non Patent Documents 2 and 3 are expected to provide a high measurement sensitivity, however, measurement is performed by adding the gold nanorods or the gold nanoparticles in the measurement solution, and therefore, the measurement operation is complicated, and further, cost required to perform the measurement is high.

The present invention has been made in order to solve the above problem, and an object thereof is to provide a method enabling, at low cost, easy measurement of a concentration of an analyte contained in a measurement solution.

Solution to Problem

A concentration measurement method according to the present invention is a method for measuring a concentration of an analyte in a measurement solution containing the analyte having reducing action, and includes (1) a mixing step of preparing a mixture solution by mixing a metal ion solution, a pH adjusting agent, and the measurement solution, (2) a metal microstructure generation step of generating a metal microstructure on a support by reducing metal ions in the mixture solution by the reducing action of the analyte in the mixture solution, (3) a measurement step of measuring an optical response of the metal microstructure on the support, and (4) an analysis step of determining a concentration of the analyte in the measurement solution on the basis of a measurement result of the optical response. Further, in the mixing step, a complexing agent may be further mixed to prepare the mixture solution.

Advantageous Effects of Invention

According to the present invention, it is possible to easily measure, at low cost, a concentration of an analyte contained in a measurement solution.

BRIEF DESCRIPTION OF DRAWINGS

FIG. 4 is a table showing samples used in examples 1 to 4.

DESCRIPTION OF EMBODIMENTS

Hereinafter, an embodiment for carrying out the present invention will be described in detail with reference to the accompanying drawings. In the description of the drawings, the same elements will be denoted by the same reference signs, without redundant description. The present invention is not limited to these examples.

Figure 1:
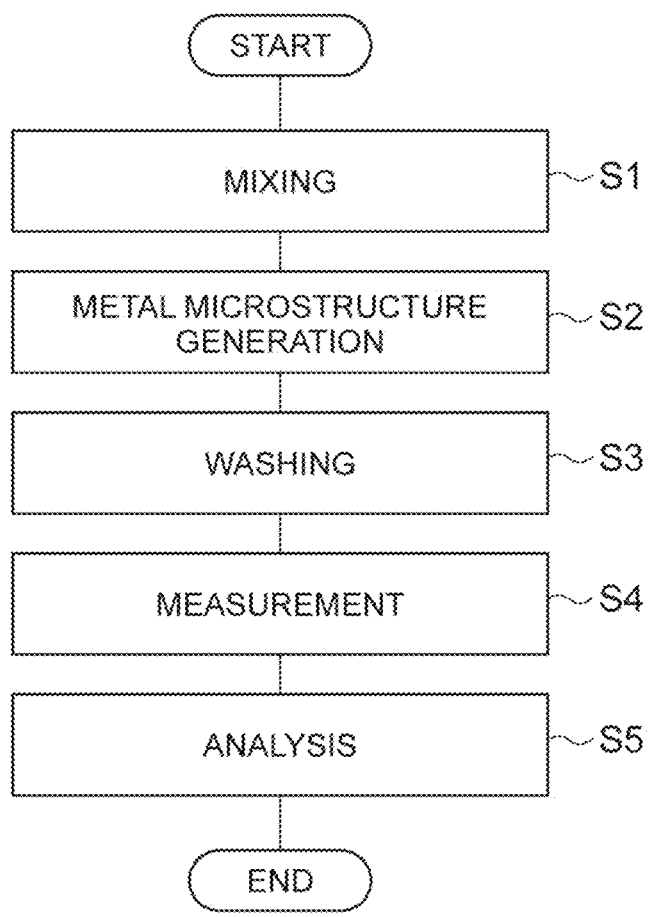
FIG. 1 is a flowchart of a concentration measurement method.

FIG. 1 is a flowchart of a concentration measurement method. This concentration measurement method measures a concentration of an analyte contained in a measurement solution, and performs concentration measurement by sequentially performing a mixing step S1, a metal microstructure generation step S2, a washing step S3, a measurement step S4, and an analysis step S5.

In the mixing step S1, a mixture solution is prepared by sufficiently mixing a measurement solution containing an analyte, a metal ion solution, a complexing agent, and a pH adjusting agent. The metal ion solution, the complexing agent, the pH adjusting agent, and the measurement solution can be mixed in various ways or in various orders. For generating a metal microstructure after a final mixture solution is prepared, the measurement solution or the pH adjusting agent is preferably mixed in the last. Here, if not necessary, the complexing agent may not be mixed.

For example, it is preferable to prepare the final mixture solution in the following manner, that is, first, a metal ion solution and a complexing agent solution are sufficiently mixed so that the complexing agent is bounded to the metal ion, a pH adjusting agent is added to the mixture and the resultant is sufficiently mixed to prepare an intermediate mixture solution, and then the intermediate mixture solution and a measurement solution are sufficiently mixed. Alternatively, it is also preferable to prepare the final mixture solution in the following manner, that is, first, a metal ion solution and a complexing agent solution are sufficiently mixed so that the complexing agent is bounded to the metal ion, a measurement solution is added to the mixture and the resultant is sufficiently mixed to prepare an intermediate mixture solution, and then the intermediate mixture solution and a pH adjusting agent are sufficiently mixed.

The analyte may be any compound having reducing action, and examples include saccharides, aldehydes, and the like. Examples of the saccharide serving as the analyte include glucose, fructose, galactose, and the like. The metal ion may be any substance reducible by the reducing action of the analyte, and examples include a silver ion and the like. The pH adjusting agent is mixed for the purpose of making the mixture solution alkaline. The complexing agent is mixed as needed to prevent oxidization of the metal after pH adjustment by the pH adjusting agent, for the purpose of stabilizing the metal ion. The amounts and the concentrations of the metal ion solution, the complexing agent, and the pH adjusting agent mixed to prepare the final mixture solution are adjusted appropriately according to the amount of the measurement solution and the concentration of the analyte.

In the metal microstructure generation step S2, the metal ions are reduced by the reducing action of the analyte, so that a metal microstructure is generated on a support. The metal microstructure on the support is a structure in which aggregations of deposited metal microparticles are distributed on the support in the form of islands. In this step, for preventing evaporation of the mixture solution, the support is preferably allowed to stand still for a predetermined time in a humidified environment.

The support may be a container used in preparation of the intermediate mixture solution or the mixture solution, and further, the support may be a substrate prepared separately from the container, and the substrate may be, for example, a slide glass. In a case where the substrate prepared separately from the container is used as the support, a metal microstructure is generated on the substrate in the following manner, that is, appropriate amounts of the intermediate mixture solution and the measurement solution are dropped onto the substrate, and the intermediate mixture solution and the measurement solution are sufficiently mixed on the substrate by use of, e.g., a micropipette, so that a final mixture solution is prepared.

The following will describe an example where glucose is used as the analyte. Glucose in the mixture solution is oxidized by a reaction expressed by the following formula (1), so that a gluconic acid is generated, and two hydrogen ions $H^+$ and two electrons $e^-$ are released (see Non Patent Document 4). Meanwhile, an n-valent metal ion $M^{n+}$ that exists in the mixture solution in a dissolved state is reduced by a reaction expressed by the following formula (2) in response to supply of n electrons $e^-$, so that a metal M in a solid state is generated. Then, the metal M becomes metal microparticles in a colloidal state (see Non Patent Document 5). The microparticles are aggregated, so that a metal microstructure is generated on the support.

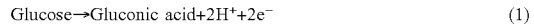
$$\text{Glucose} \rightarrow \text{Gluconic acid} + 2H^+ + 2e^- \quad (1)$$

$$M^{n+} + ne^- \rightarrow M \quad (2)$$

It is considered that, when the metal microparticles are uniformly dispersed in the solution, the amount of the metal microparticles can be determined from the degree of coloration caused by the metal microparticles, and thus, the concentration of the analyte in the measurement solution can be measured. For generating the metal microparticles uniformly dispersed in the solution, generally, at least milliliter volume of sample is required. Meanwhile, for example, in a case where blood is an object to be measured, a desirable amount of the sample is as small as possible, and thus, it is difficult to measure the concentration of the analyte by determining the amount of the metal microparticles uniformly dispersed in the solution. On the other hand, since the measurement is performed by using the metal microstructures generated on the support in the present embodiment, the concentration of the analyte can be measured even if the amount of the sample is quite small.

In the washing step S3, an area on the support in which the metal microstructure is generated is washed with water (preferably, ultrapure water). By the washing, it is possible to remove the solution unnecessary for measurement in the subsequent measurement step S4. Here, the washing step S3 may not be performed.

In the measurement step S4, an optical response of the metal microstructure on the support is measured. As the optical response, for example, a Rayleigh scattering spectrum and an extinction spectrum in a certain wavelength band may be measured, and further, a Rayleigh scattering intensity and an optical density at a specific wavelength may be measured. In a case where the metal microstructures are generated in a narrow area on the support, the optical response of the metal microstructures is preferably measured with use of a microspectroscope.

The optical response of the metal microstructure may be measured while the area on the support in which the metal microstructure is generated is dry. Further, the optical response of the metal microstructure may be measured after water is dropped onto the area on the support in which the metal microstructure is generated, and the area is covered with a cover glass. In a case where water is dropped onto the area on the support in which the metal microstructure is generated or in a case where the washing step S3 is not performed and the solution remains in the area on the support in which the metal microstructure is generated, the surface shape of the liquid may not be uniform or the surface shape of the liquid may cause a lens effect if no measure is taken, and accordingly the measurement condition becomes unstable, and therefore, the measurement is preferably performed in a state where the area is covered with a cover glass so that the measurement condition for every analyte is made homogeneous.

Figure 2:
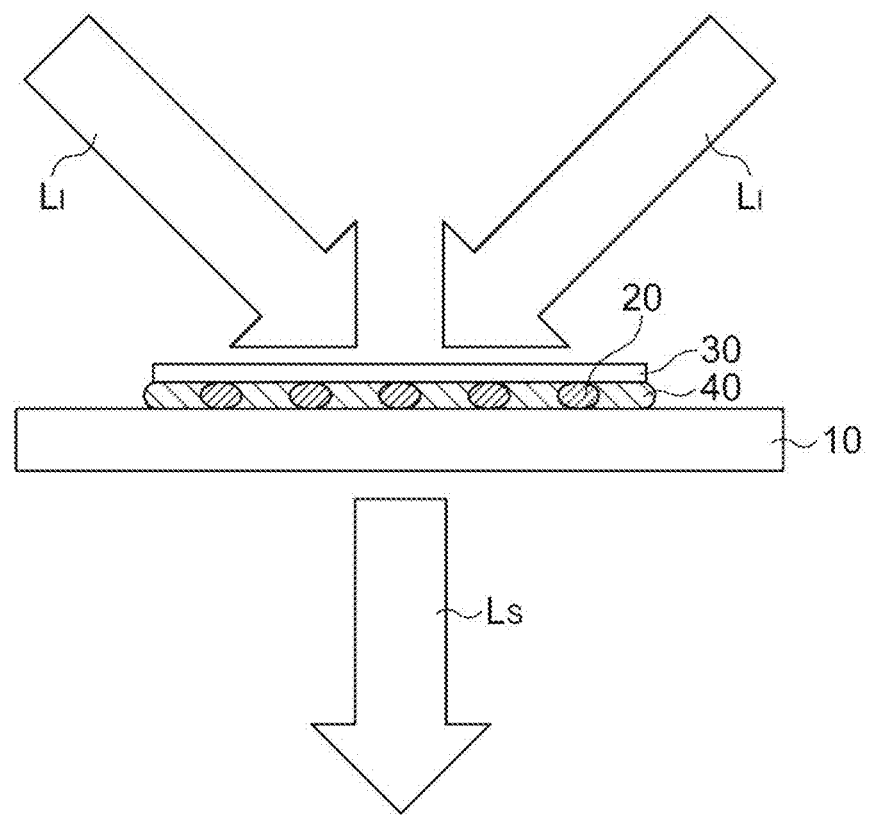
FIG. 2 is a view schematically illustrating arrangement of irradiation light and measurement light in a measurement of a Rayleigh scattering intensity.

By using a dark-field illumination in the microspectroscope, it is possible to measure a Rayleigh scattering spectrum and a Rayleigh scattering intensity at a specific wavelength. FIG. 2 is a view illustrating optical arrangement in a measurement of a Rayleigh scattering intensity. One of the principal surfaces of a support 10 has metal microstructures 20 formed thereon and is covered with a cover glass 30, and in a space between the support 10 and the cover glass 30, there exist the metal microstructures 20 and a liquid 40 such as water. Incident light $L_I$ is caused to enter the support 10 obliquely from one side of the support 10, and then, scattered light $L_S$ that exits from the other side of the support 10 perpendicularly is detected. On the basis of the detection result of the scattered light $L_S$, it is possible to measure the Rayleigh scattering intensity. Here, there are other possible configurations regarding the direction in which the incident light enters and the direction in which the scattered light is detected.

Figure 3:
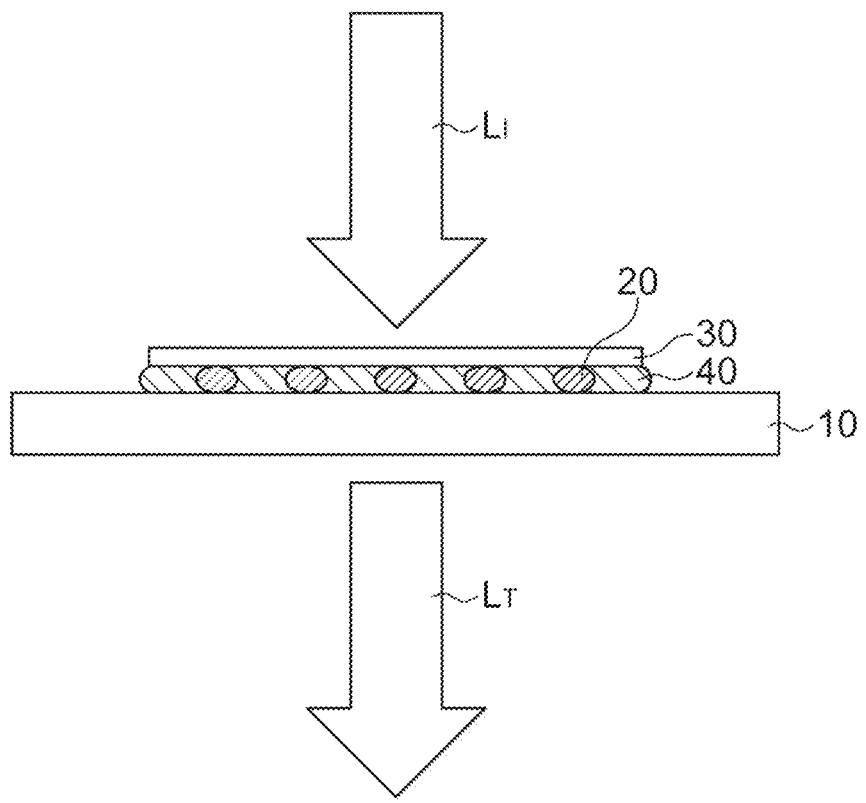
FIG. 3 is a view schematically illustrating arrangement of irradiation light and measurement light in a measurement of an optical density.

By using a bright-field illumination in the microspectroscope, it is possible to measure an extinction spectrum and an optical density at a specific wavelength. FIG. 3 is a view illustrating optical arrangement in a measurement of an optical density. One of the principal surfaces of a support 10 has metal microstructures 20 formed thereon and is covered with a cover glass 30, and in a space between the support 10 and the cover glass 30, there exist the metal microstructures 20 and a liquid 40 such as water. Incident light $L_I$ is caused to enter the support 10 from one side of the support 10 perpendicularly, and then, transmitted light $L_T$ that exits from the other side of the support 10 perpendicularly is detected. On the basis of the detection result of the transmitted light $L_T$, it is possible to measure the optical density.

In the analysis step S5, on the basis of the measurement result of the optical response, the concentration of the analyte in the measurement solution is determined. For this step, a calibration curve representing a relationship between the concentration of the analyte and the measured value of the optical response may be prepared in advance, and this makes it possible to determine the concentration of the analyte in the measurement solution, on the basis of the calibration curve and the measured value of the optical response measured in the measurement solution, which is a measurement object.

Next, examples 1 to 4 will be described. FIG. 4 is a table showing samples used in the examples 1 to 4. In the example 1, 10 mM silver nitrate solution was used as the metal ion solution, 50 mM aqueous ammonium sulfate solution was used as the complexing agent, 200 mM aqueous sodium hydroxide solution was used as the pH adjusting agent, and a measurement solution containing glucose as the analyte was used. In the example 2, a measurement solution containing fructose as the analyte was used, and the same samples as those in the example 1 were used as the other samples. In the example 3, a measurement solution containing galactose as the analyte was used, and the same samples as those in the example 1 were used as the other samples. In the example 4, 100 mM aqueous ammonia solution was used as the complexing agent, and the same samples as those in the example 1 were used as the other samples. Each of glucose, fructose, and galactose is a saccharide having reducing action. As the support for supporting the metal microstructure, a slide glass was used.

The steps were common to the examples 1 to 4, and were performed as below. In the mixing step S1, the metal ion solution, the complexing agent, and the pH adjusting agent were adjusted respectively to predetermined concentrations. The metal ion solution and the complexing agent were sufficiently mixed in a container, and the pH adjusting agent was added in the container and sufficiently mixed therein, so that an intermediate mixture solution was prepared. In this step, the amounts of the metal ion solution, the complexing agent, and the pH adjusting agent thus mixed were equal to each other. Then, 30 μL of the intermediate mixture solution was dropped onto a slide glass, and 10 μL of the measurement solution was added to the droplet thus dropped, and these solutions were sufficiently mixed on the slide glass.

In the metal microstructure generation step S2, the droplet on the slide glass was allowed to stand still for an hour in a humidified environment, so that the metal ion was reduced by the reducing action of the analyte and a metal microstructure was generated on the slide glass. In the washing step S3, an area on the slide glass in which the metal microstructure is generated was washed with ultrapure water, so that the solution unnecessary for measurement in the subsequent measurement step S4 was removed. In the measurement step S4, as an optical response of the metal microstructure on the slide glass, Rayleigh scattering and an optical density were measured. For this step, after the water was dropped onto the area on the slide glass in which the metal microstructure was generated, the area was covered with a cover glass. Further, the measurement was performed with use of a microspectroscope.

Figure 5:
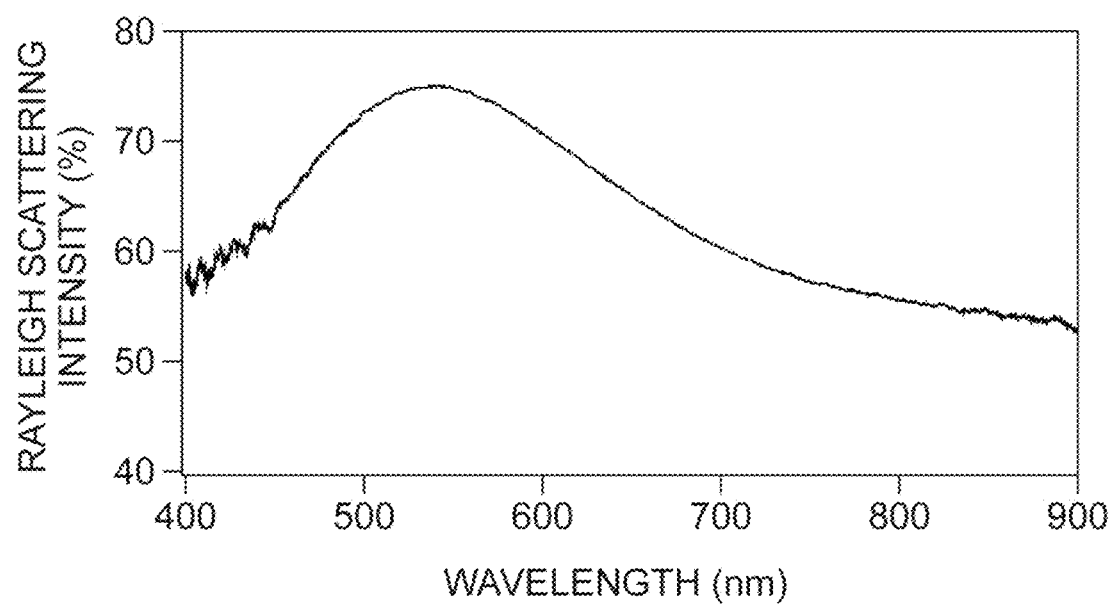
FIG. 5 is a view illustrating a Rayleigh scattering spectrum measured in a measurement step S4 in the example 1.
Figure 6:
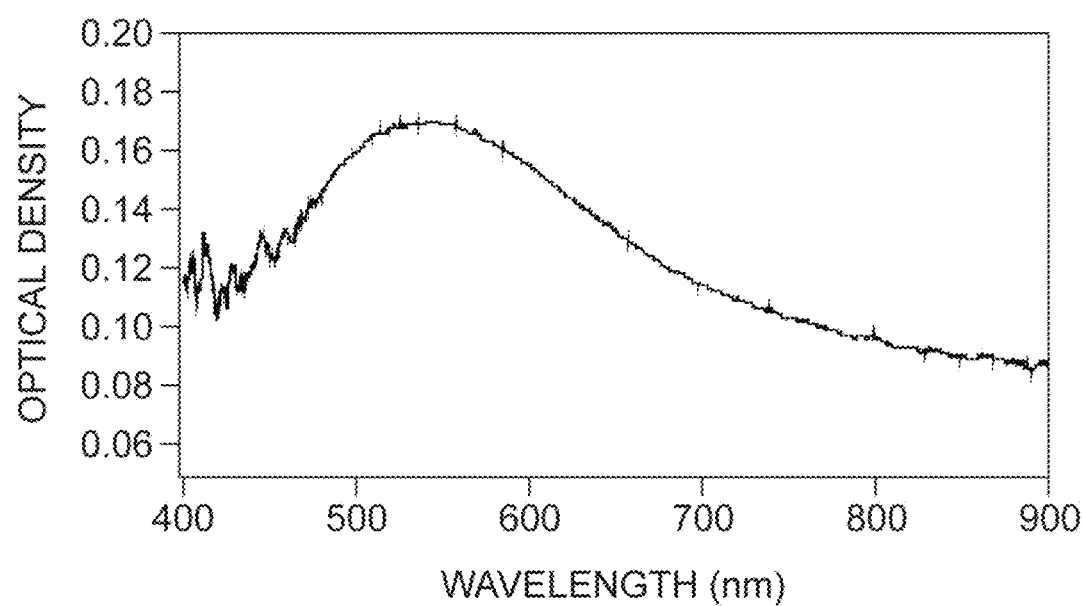
FIG. 6 is a view illustrating an extinction spectrum measured in the measurement step S4 in the example 1.

FIG. 5 is a view illustrating the Rayleigh scattering spectrum measured in the measurement step S4 in the example 1. The vertical axis in FIG. 5 represents a ratio of the Rayleigh scattering intensity measured in the measurement step S4 with respect to the Rayleigh scattering intensity measured with use of a diffuser plate with a flat optical response in a measurement wavelength range. FIG. 6 is a view illustrating the extinction spectrum measured in the measurement step S4 in the example 1. In this measurement, the concentration of the analyte (glucose) in the measurement solution was 1.0 mM. In each of the Rayleigh scattering spectrum and the extinction spectrum, a peak spreading in a broad band of a wavelength range from 450 to 700 nm is observed. This shows that, as a result of reduction, silver was deposited on the slide glass in the form of particles of nanometer order, and the particles were aggregated to form a metal microstructure.

Figure 7:
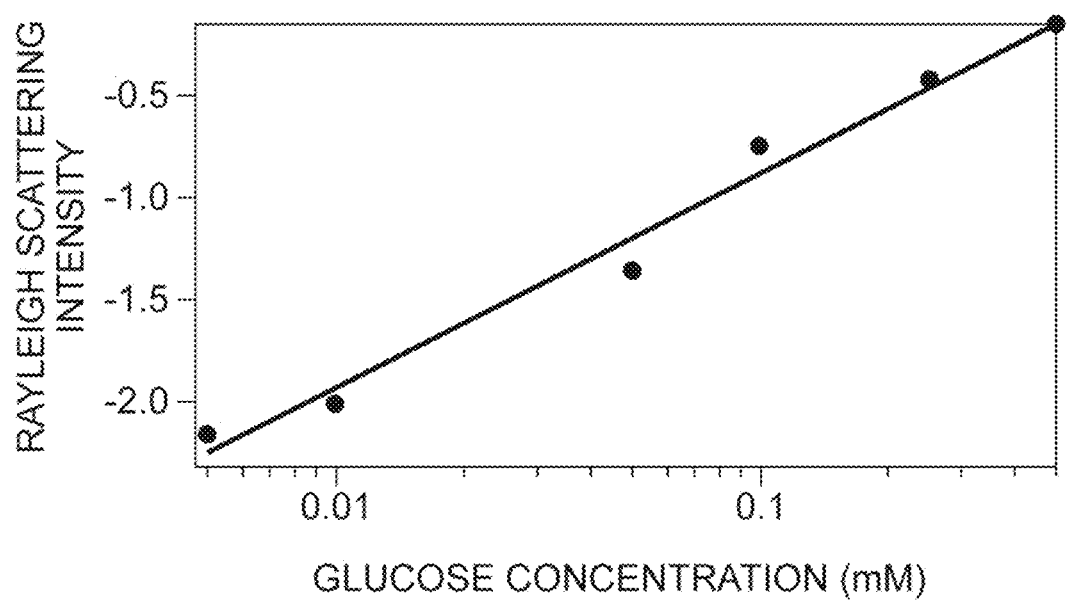
FIG. 7 is a graph showing a relation between the Rayleigh scattering intensity measured at a wavelength of 500 nm in the measurement step S4 in the example 1 and a concentration of an analyte (glucose) in a measurement solution.
Figure 8:
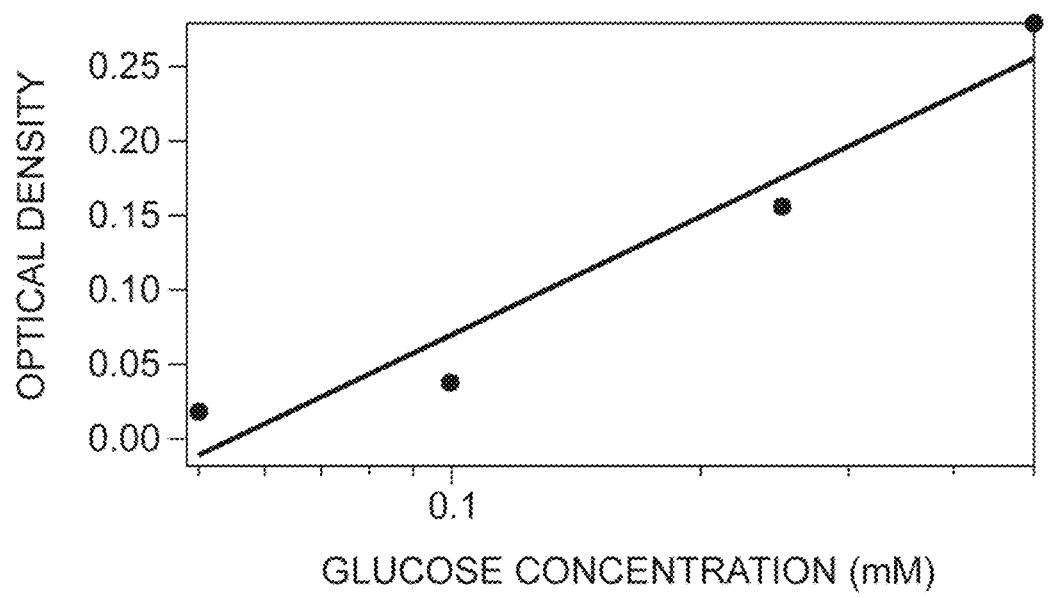
FIG. 8 is a graph showing a relation between the optical density measured at a wavelength of 500 nm in the measurement step S4 in the example 1 and the concentration of the analyte (glucose) in the measurement solution.

FIG. 7 is a graph showing a relation between the Rayleigh scattering intensity measured at a wavelength of 500 nm in the measurement step S4 in the example 1 and the concentration of the analyte (glucose) in the measurement solution. The vertical axis in FIG. 7 represents the logarithmic value of the Rayleigh scattering intensity. FIG. 8 is a graph showing a relation between the optical density measured at a wavelength of 500 nm in the measurement step S4 in the example 1 and the concentration of the analyte (glucose) in the measurement solution.

Figure 9:
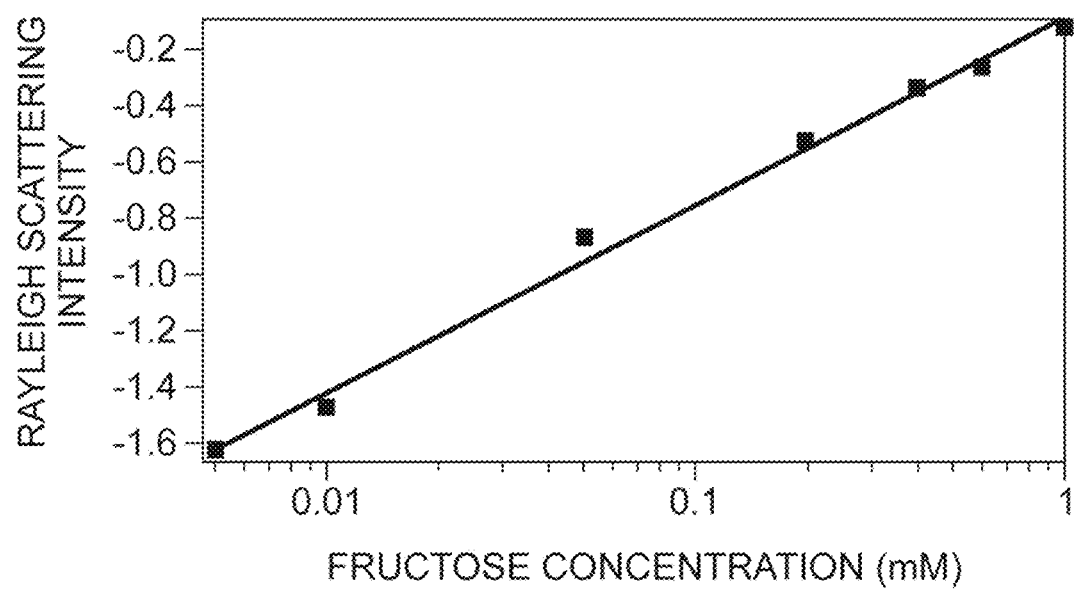
FIG. 9 is a graph showing a relation between the Rayleigh scattering intensity measured at a wavelength of 500 nm in the measurement step S4 in the example 2 and a concentration of an analyte (fructose) in the measurement solution.
Figure 10:
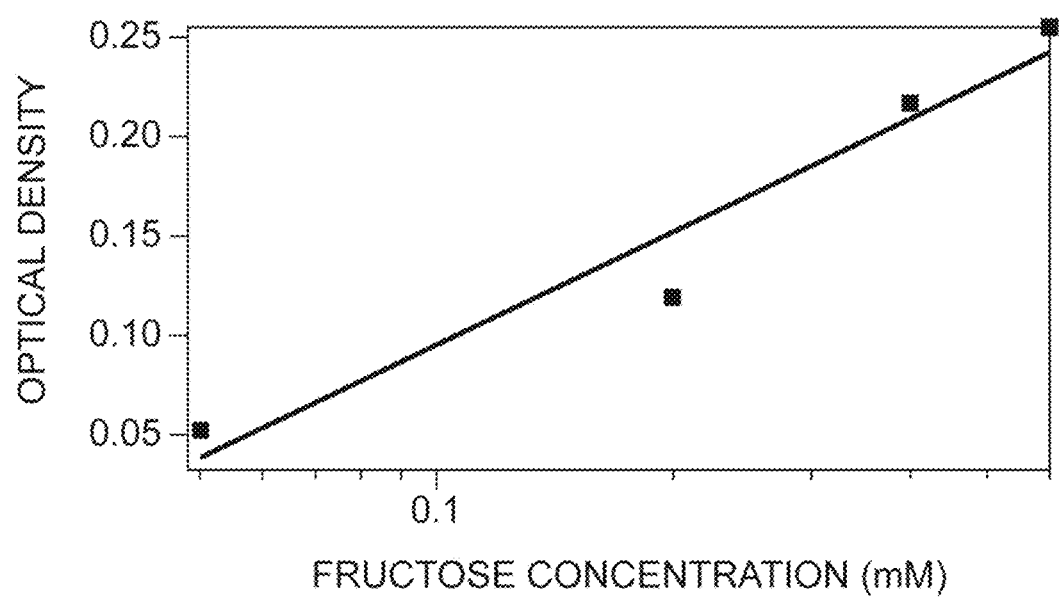
FIG. 10 is a graph showing a relation between the optical density measured at a wavelength of 500 nm in the measurement step S4 in the example 2 and the concentration of the analyte (fructose) in the measurement solution.

FIG. 9 is a graph showing a relation between the Rayleigh scattering intensity measured at a wavelength of 500 nm in the measurement step S4 in the example 2 and the concentration of the analyte (fructose) in the measurement solution. The vertical axis in FIG. 9 represents the logarithmic value of the Rayleigh scattering intensity. FIG. 10 is a graph showing a relation between the optical density measured at a wavelength of 500 nm in the measurement step S4 in the example 2 and the concentration of the analyte (fructose) in the measurement solution.

Figure 11:
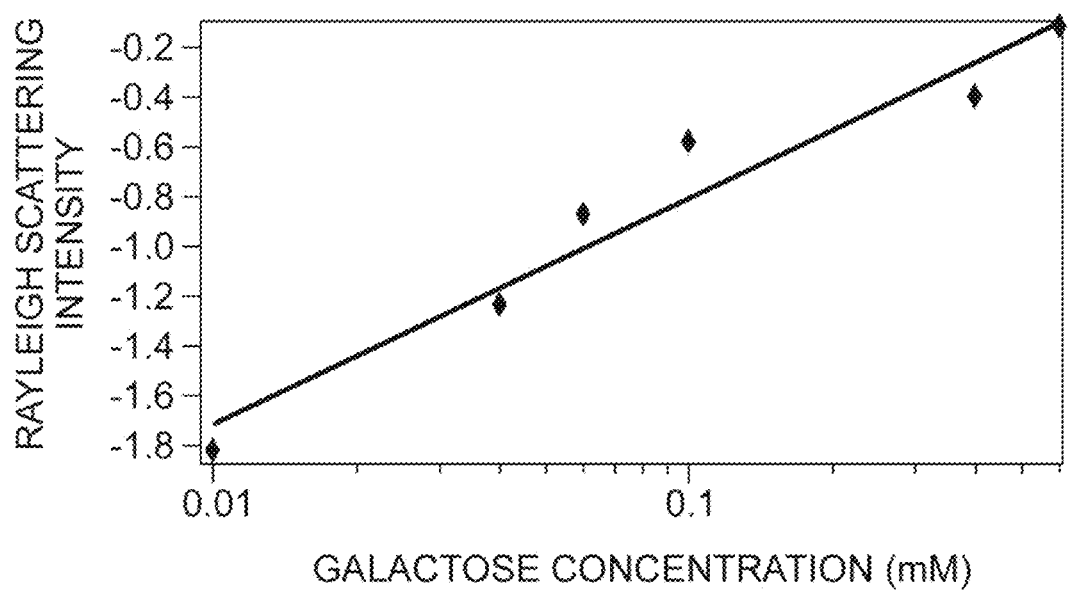
FIG. 11 is a graph showing a relation between the Rayleigh scattering intensity measured at a wavelength of 500 nm in the measurement step S4 in the example 3 and a concentration of an analyte (galactose) in the measurement solution.
Figure 12:
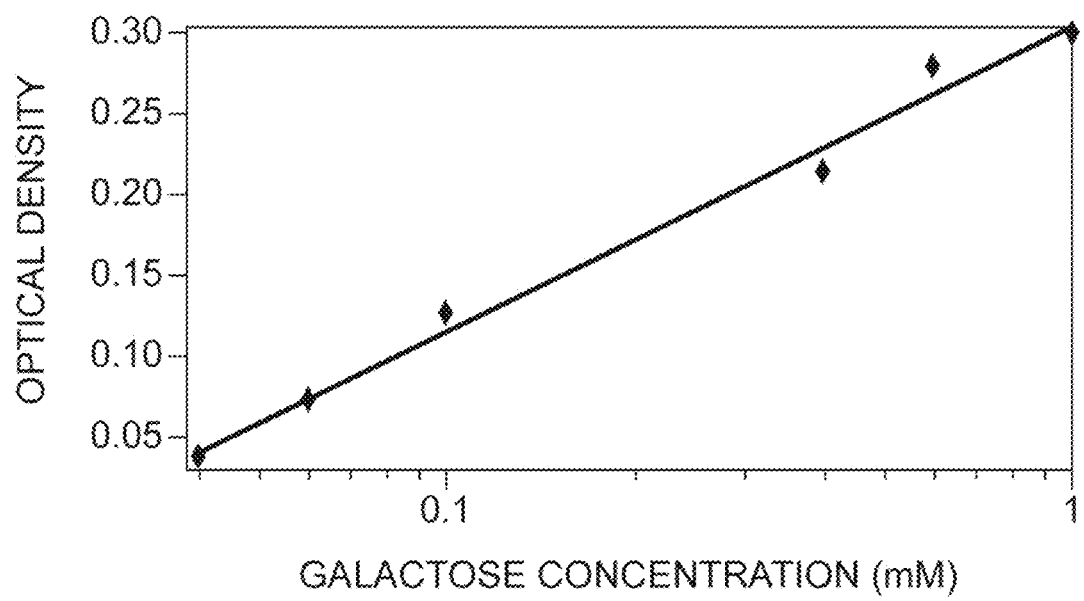
FIG. 12 is a graph showing a relation between the optical density measured at a wavelength of 500 nm in the measurement step S4 in the example 3 and the concentration of the analyte (galactose) in the measurement solution.

FIG. 11 is a graph showing a relation between the Rayleigh scattering intensity measured at a wavelength of 500 nm in the measurement step S4 in the example 3 and the concentration of the analyte (galactose) in the measurement solution. The vertical axis in FIG. 11 represents the logarithmic value of the Rayleigh scattering intensity. FIG. 12 is a graph showing a relation between the optical density measured at a wavelength of 500 nm in the measurement step S4 in the example 3 and the concentration of the analyte (galactose) in the measurement solution.

Figure 13:
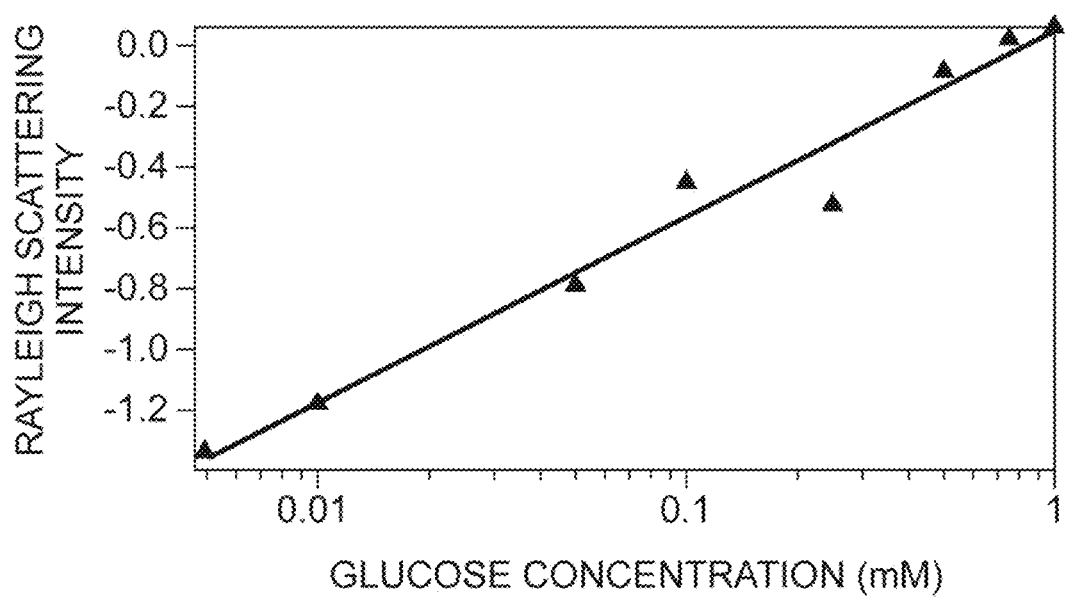
FIG. 13 is a graph showing a relation between the Rayleigh scattering intensity measured at a wavelength of 500 nm in the measurement step S4 in the example 4 and the concentration of the analyte (glucose) in the measurement solution.
Figure 14:
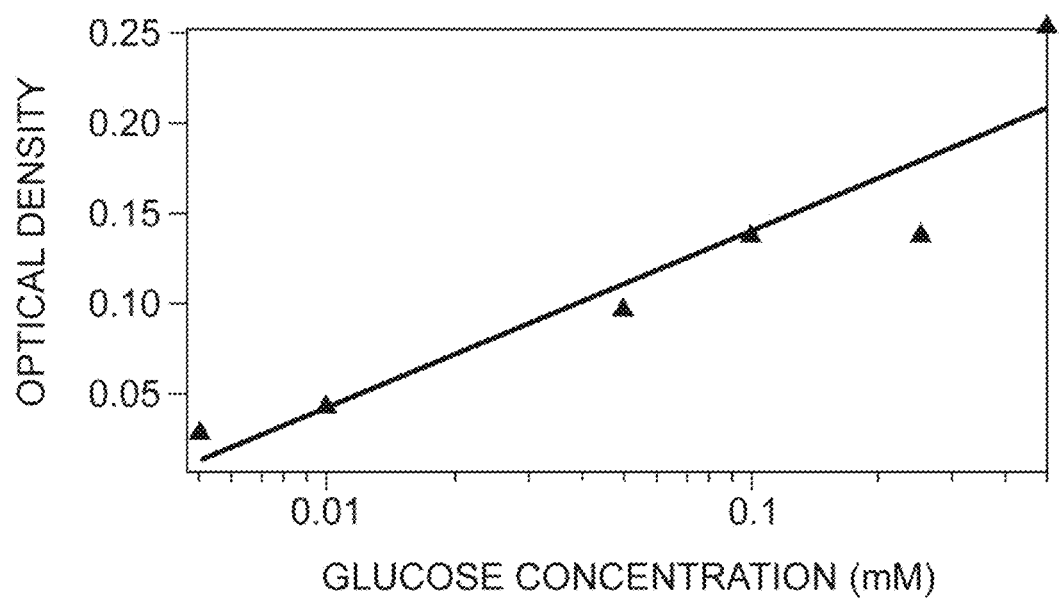
FIG. 14 is a graph showing a relation between the optical density measured at a wavelength of 500 nm in the measurement step S4 in the example 4 and the concentration of the analyte (glucose) in the measurement solution.

FIG. 13 is a graph showing a relation between the Rayleigh scattering intensity measured at a wavelength of 500 nm in the measurement step S4 in the example 4 and the concentration of the analyte (glucose) in the measurement solution. The vertical axis in FIG. 13 represents the logarithmic value of the Rayleigh scattering intensity. FIG. 14 is a graph showing a relation between the optical density measured at a wavelength of 500 nm in the measurement step S4 in the example 4 and the concentration of the analyte (glucose) in the measurement solution.

Each of FIG. 7 to FIG. 14 shows the positions representing the measured values at respective concentrations of the analyte, and in addition, a straight line resulting from linear approximation of a relation between the measured values and the concentrations of the analyte. As shown in these drawings, in each of the examples 1 to 4, both of the logarithmic value of the Rayleigh scattering intensity and the optical density exhibited a high correlation with the logarithmic value of the concentration of the analyte in the measurement solution, and a good linear relationship was obtained. In each of the examples 1 to 3, as compared to the optical density, the logarithmic value of the Rayleigh scattering intensity exhibited a higher correlation with the logarithmic value of the concentration even in a range in which the concentration of the analyte in the measurement solution is low. In the example 4, the logarithmic value of the Rayleigh scattering intensity and the optical density exhibited, to the similar extent, a high correlation with the logarithmic value of the concentration even in a range in which the concentration of the analyte in the measurement solution is low.

In addition to the examples 1 to 4 described above, an example 5 was performed. In the example 5, 10 mM aqueous silver nitrate solution was used as the metal ion solution, 10 mM aqueous potassium hydroxide solution was used as the pH adjusting agent, and a measurement solution containing glucose as the analyte was used. Further, in this example, no complexing agent was used.

In the example 5, 10 μL of 10 mM aqueous silver nitrate solution was dropped onto a substrate such as a slide glass, and 10 μL of aqueous glucose solution of a predetermined concentration was added to the dropped spot, and then, these solutions were mixed on the substrate. Further, 5 μL of 10 mM aqueous potassium hydroxide solution was added to the dripped spot and mixed on the substrate, and the substrate was allowed to stand still for an hour, so that a metal microstructure made of a small amount of silver was deposited on a portion of the substrate onto which the solution was dropped. In addition, for removing the remaining solution unnecessary for the measurement, the substrate was immersed in ultrapure water for washing.

Figure 15:
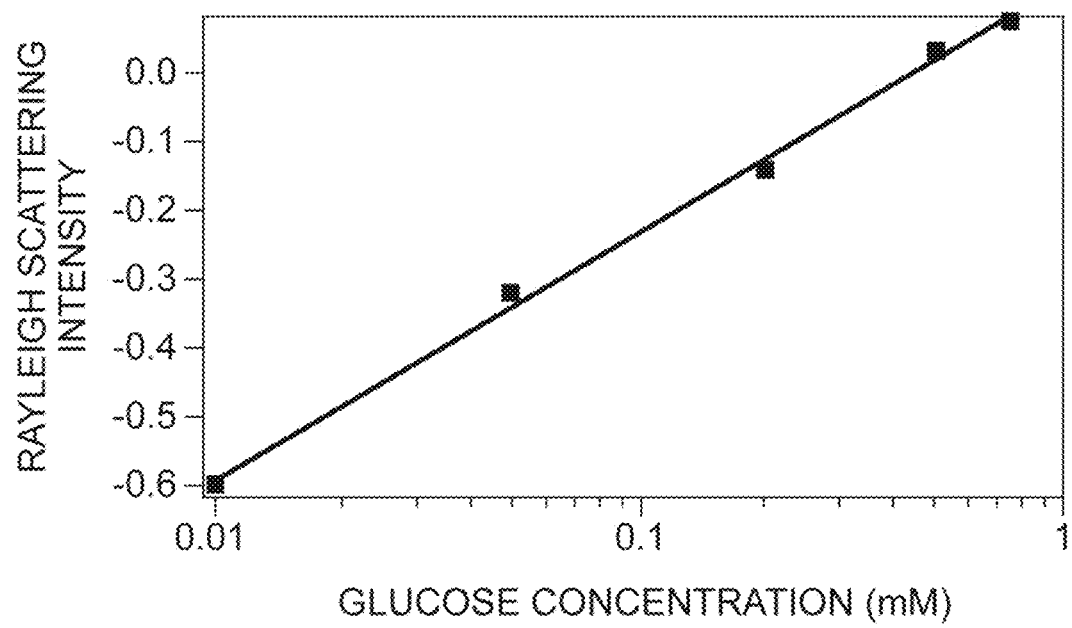
FIG. 15 is a graph showing a relation between the Rayleigh scattering intensity measured at a wavelength of 500 nm in the example 5 and the concentration of the analyte (glucose) in the measurement solution.
Figure 16:
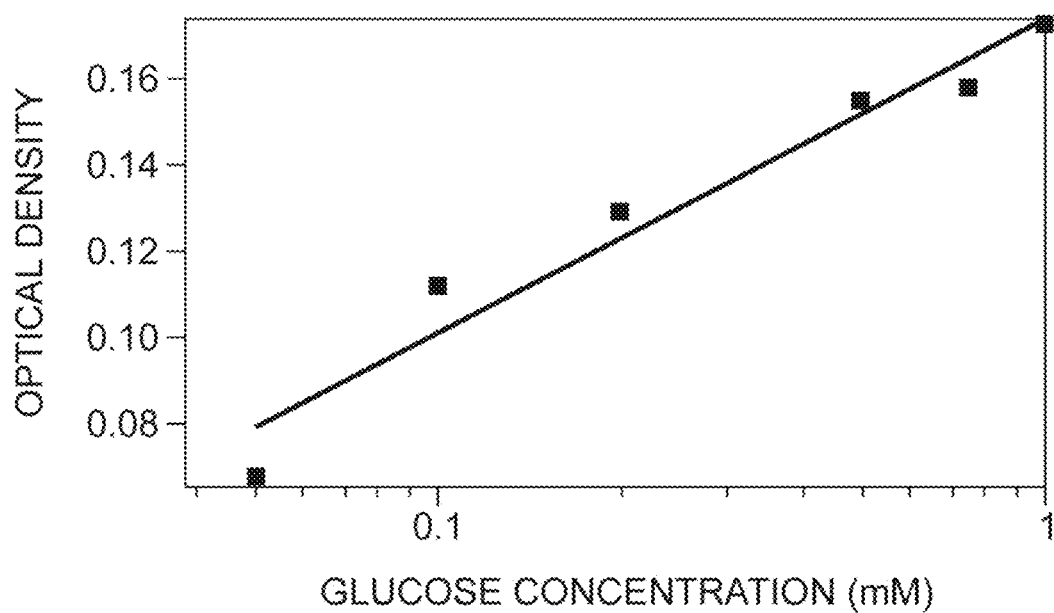
FIG. 16 is a graph showing a relation between the optical density measured at a wavelength of 500 nm in the example 5 and the concentration of the analyte (glucose) in the measurement solution.

FIG. 15 is a graph showing a relation between the Rayleigh scattering intensity measured at a wavelength of 500 nm in the example 5 and the concentration of the analyte (glucose) in the measurement solution. The vertical axis in FIG. 15 represents the logarithmic value of the Rayleigh scattering intensity. FIG. 16 is a graph showing a relation between the optical density measured at a wavelength of 500 nm in the example 5 and the concentration of the analyte (glucose) in the measurement solution.

As shown in these drawings, as well as in the examples 1 to 4, even in the example 5 in which no complexing agent was used, both of the logarithmic value of the Rayleigh scattering intensity and the optical density exhibited a high correlation with the logarithmic value of the concentration of the analyte in the measurement solution, and a good linear relationship was obtained.

As described above, the concentration measurement method of the present embodiment includes measuring a concentration of an analyte in a measurement solution by generating a metal microstructure on a support by reducing action of the analyte in a mixture solution and measuring an optical response of the metal microstructure. Thus, the concentration measurement method of the present embodiment does not need to use an enzyme, which is not easy to handle, and further, does not need to add gold nanorods in the measurement solution, and accordingly, it is possible to easily measure, at low cost, the concentration of the analyte in the measurement solution. Further, the concentration measurement method of the present embodiment allows a sample used in a measurement to be preserved easily and independently of, e.g., an inactivation of an enzyme, and accordingly, it is possible to perform measurement in a stable manner.

A current method for measuring, e.g., a blood sugar level by using an electric response has a sensitivity of approximately 1 mM (18 mg/dL). On the other hand, the concentration measurement method of the present embodiment can attain a sensitivity two or more orders of magnitude greater than that of the current measurement method with use of the electric response. Such a sensitivity is almost equal to a sensitivity of the measurement method with use of an enzyme reaction and which is currently used for research purposes.

For medical purposes such as measurement of a blood sugar level, the conventional method measures a concentration of an analyte in a range approximately from 10 to 600 mg/dL. In the concentration measurement method of the present embodiment, appropriately adjusting a concentration of metal ions in a metal ion solution makes it possible to measure a concentration of an analyte in a measurement solution in a wide concentration range of the analyte. Further, in the concentration measurement method of the present embodiment, a concentration of an analyte may be measured in a diluted measurement solution, and this makes it possible to reduce an influence given by impurities.

The analyte, which is an object to be measured in the concentration measurement method of the present embodiment, is a compound having reducing action, and examples include saccharides, aldehydes, and the like. In particular, the saccharides have an important role in a living body, and thus, measuring the concentration of the saccharides leads to understanding of the health condition of the living body. In particular, a blood concentration of glucose, which is one of the saccharides, is an important parameter of a living body that determines the condition of diabetes. According to the research by Ministry of Health, Labour and Welfare of Japan, 16.2% of males and 9.2% of females were diabetic patients in 2013 in Japan. Further, according to the report by Allied Market Research, which is a market research agency in the U.S., a market for continuous glucose monitoring is expected to reach 56.85 billion dollars by 2020.

A glucose concentration measurement method that is currently most common measures a concentration of glucose by oxidizing glucose in an aqueous solution by glucose oxidase to generate hydrogen peroxide and monitoring the hydrogen peroxide thus generated. Since this method uses the enzyme, preservation of the enzyme and the measurement operation are complicated. On the other hand, glucose concentration measurement according to the concentration measurement method of the present embodiment does not use an enzyme, and thus, it is easy to preserve a sample to be used in a measurement, and it is possible to perform measurement with high accuracy and high sensitivity in a simple manner, and therefore, this method is expected to be in wide use.

The concentration measurement method according to the present invention is not limited to the embodiment and configuration examples described above, and can be modified in various ways.

The concentration measurement method according to the above-described embodiment is a method for measuring a concentration of an analyte in a measurement solution containing the analyte having reducing action, and includes (1) a mixing step of preparing a mixture solution by mixing a metal ion solution, a complexing agent, a pH adjusting agent, and the measurement solution, (2) a metal microstructure generation step of generating a metal microstructure on a support by reducing metal ions in the mixture solution by the reducing action of the analyte in the mixture solution, (3) a measurement step of measuring an optical response of the metal microstructure on the support, and (4) an analysis step of determining a concentration of the analyte in the measurement solution on the basis of a measurement result of the optical response.

Further, the concentration measurement method according to the above-described embodiment is a method for measuring a concentration of an analyte in a measurement solution containing the analyte having reducing action, and includes (1) a mixing step of preparing a mixture solution by mixing a metal ion solution, a pH adjusting agent, and the measurement solution, (2) a metal microstructure generation step of generating a metal microstructure on a support by reducing metal ions in the mixture solution by the reducing action of the analyte in the mixture solution, (3) a measurement step of measuring an optical response of the metal microstructure on the support, and (4) an analysis step of determining a concentration of the analyte in the measurement solution on the basis of a measurement result of the optical response. In this case, if necessary, the method may be configured such that the mixing step includes preparing the mixture solution by mixing the metal ion solution, the pH adjusting agent, the measurement solution, and a complexing agent.

The above-described concentration measurement method may be configured such that the mixing step includes preparing the mixture solution by mixing the metal ion solution, the complexing agent, and the pH adjusting agent to prepare an intermediate mixture solution, and mixing the intermediate mixture solution and the measurement solution. Further, the above-described concentration measurement method may be configured such that the mixing step includes preparing the mixture solution by mixing the metal ion solution, the complexing agent, and the measurement solution to prepare an intermediate mixture solution, and mixing the intermediate mixture solution and the pH adjusting agent.

The above-described concentration measurement method may further include, between the metal microstructure generation step and the measurement step, a washing step of washing an area on the support in which the metal microstructure is generated.

The above-described concentration measurement method may be configured such that the metal microstructure generation step includes generating the metal microstructure on the support by allowing the support to stand still for a predetermined time in a humidified environment.

The above-described concentration measurement method may be configured such that the measurement step includes measuring the optical response of the metal microstructure in a state where an area on the support in which the metal microstructure is generated is covered with a cover glass. Further, the above-described concentration measurement method may be configured such that the measurement step includes measuring a Rayleigh scattering intensity or an optical density as the optical response of the metal microstructure.

INDUSTRIAL APPLICABILITY

The present invention is usable as a concentration measurement method enabling, at low cost, easy measurement of a concentration of an analyte contained in a measurement solution.

REFERENCE SIGNS LIST

10—support, 20—metal microstructure, 30—cover glass, 40—liquid.

The invention claimed is:

1. A concentration measurement method for measuring a concentration of an analyte in a measurement solution containing the analyte having reducing action, the method comprising:
   a first step of preparing the measurement solution containing the analyte which is an object to be measured;
   a mixing step of, after the first step, preparing a mixture solution by mixing a metal ion solution containing metal ions, a pH adjusting agent, and the measurement solution containing the analyte;
   a metal microstructure generation step of, after the mixing step, generating a metal microstructure on a support by reducing the metal ions in the mixture solution by the reducing action of the analyte in the mixture solution, the metal microstructure being a structure in which aggregations of deposited metal microparticles are distributed on the support in the form of islands;
   a measurement step of, after the metal microstructure generation step, measuring an optical response of the metal microstructure generated by the reducing action of the analyte in the metal microstructure generation step on the support; and
   an analysis step of, after the measurement step, determining a concentration of the analyte in the measurement solution on the basis of a measurement result of the optical response in the measurement step.

2. The concentration measurement method according to claim 1, wherein the mixing step includes preparing the mixture solution by mixing the metal ion solution, the pH adjusting agent, the measurement solution, and a complexing agent.

3. The concentration measurement method according to claim 2, wherein the mixing step includes preparing the mixture solution by mixing the metal ion solution, the complexing agent, and the pH adjusting agent to prepare an intermediate mixture solution, and mixing the intermediate mixture solution and the measurement solution.

4. The concentration measurement method according to claim 2, wherein the mixing step includes preparing the mixture solution by mixing the metal ion solution, the complexing agent, and the measurement solution to prepare an intermediate mixture solution, and mixing the intermediate mixture solution and the pH adjusting agent.

5. The concentration measurement method according to claim 1, further comprising, between the metal microstructure generation step and the measurement step, a washing step of washing an area on the support in which the metal microstructure is generated.

6. The concentration measurement method according to claim 1, wherein the metal microstructure generation step includes generating the metal microstructure on the support by allowing the support to stand still for a predetermined time in a humidified environment.

7. The concentration measurement method according to claim 1, wherein the measurement step includes measuring the optical response of the metal microstructure in a state where an area on the support in which the metal microstructure is generated is covered with a cover glass.

8. The concentration measurement method according to claim 1, wherein the measurement step includes measuring a Rayleigh scattering intensity as the optical response of the metal microstructure.

9. The concentration measurement method according to claim 1, wherein the measurement step includes measuring an optical density as the optical response of the metal microstructure.

* * * * *